June 8, 1965  F. W. R. STARP  3,187,654
PHOTOGRAPHIC INTRA-LENS SHUTTER
Filed Feb. 7, 1962  2 Sheets-Sheet 2
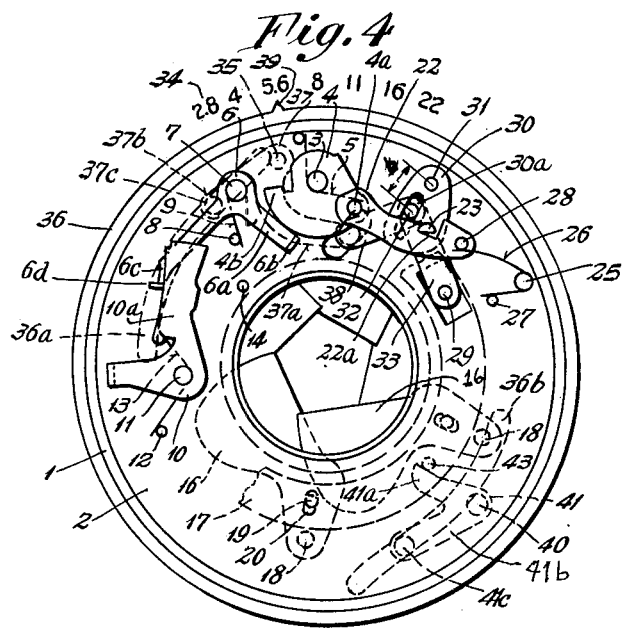
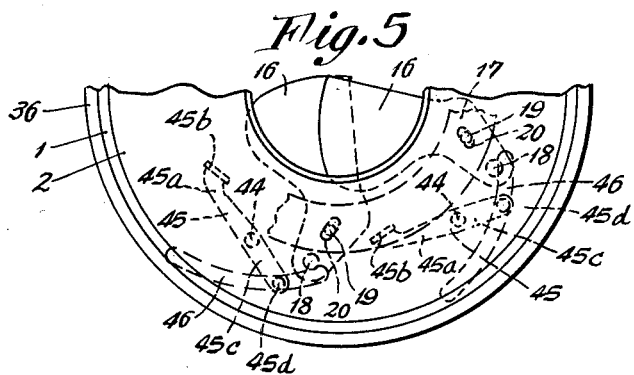
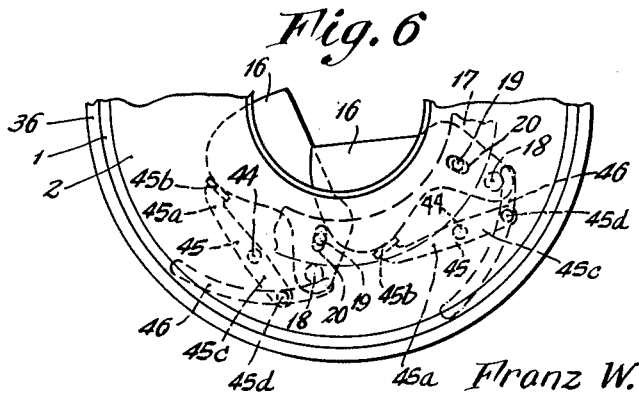
INVENTOR.
Franz W. R. Starp
BY
Arthur A. March
ATTORNEY

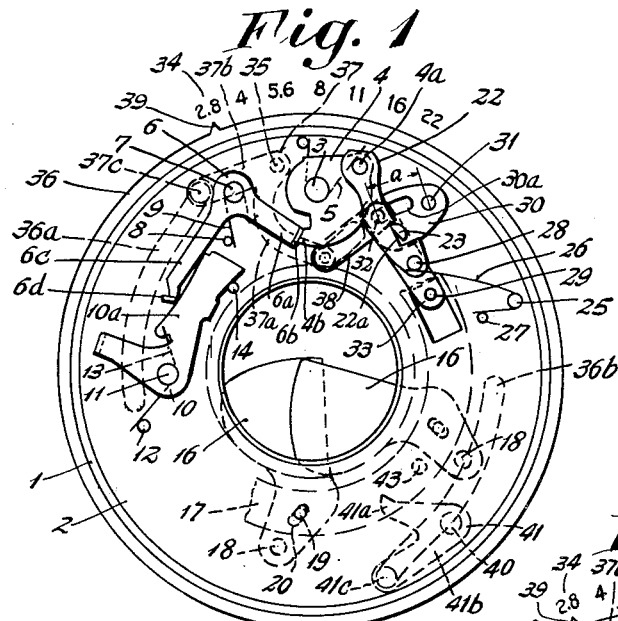
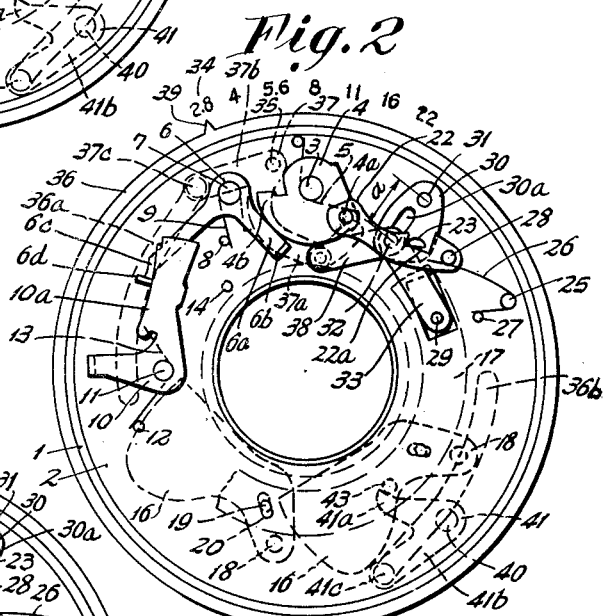
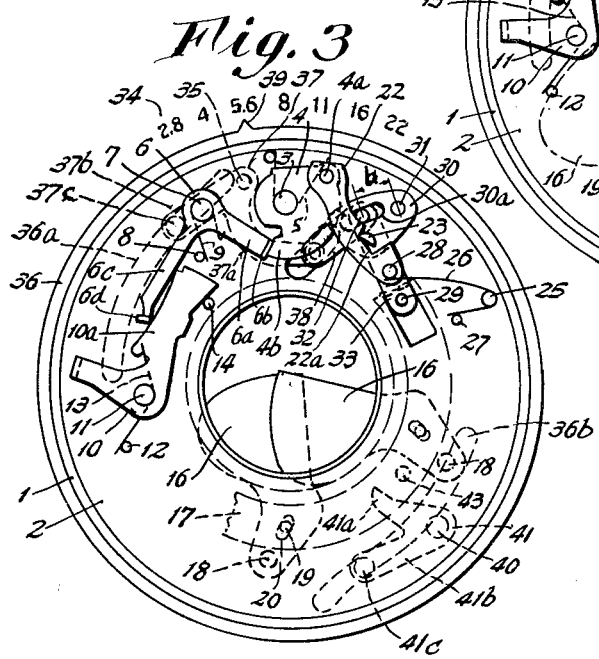

United States Patent Office 3,187,654
Patented June 8, 1965

3,187,654
PHOTOGRAPHIC INTRA-LENS SHUTTER
Franz W. R. Starp, Calmbach (Enz), Germany, assignor to Alfred Gauthier, G.m.b.H., Calmbach (Enz), Germany, a corporation of Germany
Filed Feb. 7, 1962, Ser. No. 171,705
Claims priority, application Germany, Feb. 8, 1961, G 31,549
6 Claims. (Cl. 95—63)

The invention relates to a photographic intra-lens shutter of the type incorporating shutter blades which are adjustable to provide a variable aperture during the exposure in response to the setting of a linkage mechanism arranged between the driving member of the shutter and a shutter-blade driving ring.

In a well known shutter of this type, the driving ring of the shutter-blades is provided with a radially extending lower arm which projects beyond the side wall of the shutter housing. The lever arm is connected to a spring driven crank mechanism arranged outside the shutter housing by means of a crank pin located in a slot in the lever arm. The crank pin is movable in the slot of the lever arm in order to make it possible to obtain an angular path of a different size to effect a variable opening of the shutter blades.

A disadvantage of this shutter construction is that the shutter blades swing out to the predetermined set aperture at a point during the operation of the shutter even when the driving mechanism is under spring tension and the crank pin of the crank drive mechanism is moved from one extreme position to the other. It was therefore necessary to provide an additional controllable covering device which becomes operative during the cocking process of the shutter and prevents the film from being exposed to light in advance of the actual exposure. Moreover, the setting of the aperture of the shutter blades in this shutter construction is inaccurate and complicated due to the fact that in order to set the aperture the crank pin must be released by loosening a retaining nut and thereafter the crank pin must be shifted on the comparatively short crank arm and again be clamped by tightening the nut. In addition, there is another objectionable feature in that the crank mechanism of the shutter requires a substantial number of structural members. For this reason, and because of the cooperative action between the lever arm and the driving ring, a special housing is required which is flangedly secured to the actual shutter housing.

Another known shutter of this type has shutter blades which pivot to form a specific aperture diameter during the exposure. The shutter blades operate in response to the setting of a diaphragm setting member, wherein two rings are used. These rings are rotatable in the lens housing and are under spring tension. The first ring carries the shutter blades which are provided with eccentrically arranged pins engaging into slide slots of the second ring. Upon the cocking of the shutter the two rings are first rotated simultaneously in the same direction and are retained in the cocked position. Each ring is retained by a releasable arresting lever, in such manner that, upon release, the first ring moves the shutter blades about their pivots and opens the shutter, whereupon the second ring pivots the shutter blades about their eccentric pins and closes the shutter. The aperture diameter of the shutter blades in this known arrangement depends on the setting of a stop which is adjustable by means of screw spindles and which terminates the return motion upon the impinging of a lever arranged on each of the rings. This known shutter arrangement requires the use of two shutter blade driving rings and, consequently, necessitates the provision of a substantial additional number of complicated and troublesome structural members for positioning and guiding said rings. In addition, another disadvantage present in this arrangement is the fact that the necessity for obtaining aperture diameters of different sizes of the shutter blades or angular paths of different widths of the rings makes it impossible to use said rings for carrying out additional functions, such as, for example, controlling a flash contact or actuating locking devices at the end of the exposure operation.

The above objections and disadvantages of prior shutter constructions of the type described are obviated by the present invention and it is an object of the present invention to provide a novel and improved shutter construction wherein the shutter blade driving ring travels a shorter or longer angular path during the exposure in response to the setting of the diaphragm setting member, while the shutter driving member makes the same travel. The improved shutter construction is also capable of containment within a closed housing and may be used with a conventional diaphragm setting member.

The foregoing is accomplished in accordance with this invention by the provision of a novel and unique transmission means which comprise a pivotable rocker arm, driving means connecting the same with the shutter driving member and a connecting rod articulately acting on the rocker arm at one end and on the shutter blade driving ring at the other end. The connecting point between the rocker arm and the connecting rod is variable by means of a setting mechanism cooperating with a diaphragm scale for the purpose of obtaining different angular paths of the shutter blade driving ring. By this arrangement an intra-lens shutter is provided which, while utilizing conventional structure and the consequent functional advantages thereof, nevertheless overcomes and obviates the objectionable features and disadvantages of the shutter construction hereinbefore described.

According to the present invention the conventional diaphragm setting member may be used to dependably influence and determine the aperture diameter of the shutter blades.

The present invention provides a simple and efficient shutter which has flexibility and freedom of choice. This has been accomplished by providing the rocker arm with a slot which extends substantially radially to its axis and which accommodates a pin located at one end of the connecting rod.

In addition, it is possible to vary the transmission ratio of the lever arrangement with only a few structural elements while utilizing a well known diaphragm setting member. To accomplish this result there is provided a two-armed lever for setting the pin in the slot. One arm of this lever is pivotally connected to the pin on the connecting rod by means of a coupling rod, while the other arm cooperates with a cam on the diaphragm setting member. By this means a great many diaphragm preselections are available and consequently provide an arrangement on the setting scale for the diaphragm preselection which is extensive and insures an easily visible setting.

Further, in order to prevent the shutter blades from swinging out to a greater extent than the actual aperture diameter set in accordance with the diaphragm preselection despite deterioration which may occur in the articulated places of the driving mechanism elements, the present invention provides a movable stop in association with the shutter blades. This stop is adjustably responsive to the setting of the diaphragm setting element and represents a further limitation on the degree of movement of the shutter blades with respect to the aperture diameter set in any particular instance. One exemplary arrangement for this purpose is to associate with the driving ring of the shutter blades a stop developed as a two-armed lever, one arm of which cooperates with a cam of the diaphragm setting member while the other arm is located in the path of movement of a stop pin arranged on the shutter blade driving ring. Another arrangement is the provision of a plurality of movable stops associated directly with each of the individual shutter blades which are adjustable jointly in response to the setting motion of a setting mechanism. By this means, play between the pivotable connections of shutter blades and driving ring has no effect on the respective maximum opening of the shutter blades.

Details of the invention are set forth in the following specification which, in conjunction with the drawings, illustrate the subject matter of the invention, and in which:

FIG. 1 is a front elevational view of the assembled interior components of a photographic intra-lens shutter assemblage as provided by the invention. The shutter is shown in its cocked position and set at the largest diaphragm opening and the shutter blades in closed position.

FIG. 2 is a view like that of FIG. 1 but showing the shutter in semi-run down position with the shutter blades in fully open position.

FIG. 3 is a similar view showing the shutter in cocked position and set at a medium diaphragm value with the shutter blades in closed position.

FIG. 4 is a view like that of FIG. 3 with the shutter in semi-run down position and the shutter blades positioned to the set diaphragm value.

FIG. 5 is a fragmentary front elevational view of a modified form of the present invention showing the shutter blades in closed position and two movable stops directly associated with the shutter blades and limiting the opening motion thereof.

FIG. 6 is a view like that of FIG. 5 with the stops in the same position as shown in FIG. 5 but having the shutter blades in open position.

Referring to the drawings, the housing of the photographic intra-lens shutter is generally indicated by the numeral 1. Within the housing 1, the usual base plate 2 is provided for positioning the individual members of the shutter construction. Carried on the base plate 2 about an axis 3 is the rotatable cocking and driving disk 4 of the shutter drive mechanism. The driving spring 5 arranged about the axis 3 is adapted to place the driving disk 4 under spring tension upon counterclockwise movement to the positions shown in FIGS. 1 and 3.

A two-armed arresting lever 6, pivotable about an axis 7, retains the driving disk 4 in cocked position. The lever 6 is located on the face side of the base plate 2. The arresting lever 6 consists of two arms 6a and 6c whose extremities are provided with lugs 6b and 6d, respectively. The arresting lever 6 is placed under spring tension by a spring 9 coiled about axis 7. To influence the lever 6 in a counterclockwise direction, one end of spring 9 engages pin 8, and the other end of spring 9 engages lever arm 6a. A projection 4b provided on the driving disk 4 engages the lug 6b on the arresting lever arm 6a when the disk is in cocked position. A release lever 10 is located in the path of movement of the arm 6c of the arresting lever 6 and the arm 10a of said release lever engages the lug 6d on the arm of the arresting lever 6. The release lever is pivotally disposed about an axis 11 on the base plate 2 and is biased by a coil spring 13 mounted on said axis. One end of the spring 13 abuts against the pin 12 and influences the rotation of the release lever in a clockwise direction. When the shutter is in cocked position the rotary motion of the release lever is limited by means of a pin 14 in the conventional manner.

As shown in the drawings, both the shutter blades 16 and the driving ring 17 are located between the base plate 2 and the bottom of the shutter housing 1. The shutter blades 16, which are only partly shown in FIGS. 1 to 3 for clarity's sake, are rotatably positioned about an axis 18 on the base plate 2. A pin 19 and groove 20 operably connect the shutter blades 16 with the driving ring 17. The shutter blades are arranged rotatably and coaxially with the axis of the lens in such manner that when the driving ring 17 is rotated in a clockwise direction the shutter blades 16 swing out from the closed position shown in FIGS. 1 and 3, to the open position illustrated in FIGS. 2 and 4. A driving pawl 22 pivotally arranged about a pin 4a on the driving disk 4 actuates the driving ring 17 of the shutter blades 16 in the conventional manner. Jaws 22a are provided on the free end of the pawl 22 and cooperate with the driving pin 23. To maintain the coupling jaws 22a of the driving pawl 22 in operative connection with the driving pin 23, a coil spring 26 is provided on the fixed pin 25. One end of the spring 26 engages the fixed pin 27 and the other end of the spring engages a pin 28 provided on the free end of the driving pawl 22 in such fashion that the pawl 22 is influenced in a counterclockwise direction.

In accordance with the present invention and in order to accomplish the desired result, the driving pin 23 is disposed on a rocker arm 30 which is pivotally positioned about the axis 31 on the base plate 2. As shown in the drawings, the rocker arm 30 is disk-shaped and is provided with a radially extending slot 30a which accommodates a pin 32. The pin 32 is located at one end of the connecting rod 33. The other end of the connecting rod is articulately connected to the driving ring 17 by means of a pin 29 and by reason of the construction set forth the connecting rod transmits the driving force from the rocker arm 30 to the driving ring 17.

According to the present invention, it is possible to vary the transmission ratio for the angular path traveled by the driving ring during its oscillating motion in a simple, expedient and efficient manner. To accomplish this result, the pin 32 on the connecting rod 33 is movable in the slot 30a of the rocker arm 30 thereby to vary the connecting point between the connecting rod and the rocker arm by means of a setting mechanism cooperating with the diaphragm scale 34. This setting mechanism may comprise, for example, a rotatable setting disk 36 arranged coaxially with the axis of the lens. To transmit motion from the setting disk 36 to the pin 32 accommodated within the slot 30a, a two-armed setting lever 37 (indicated by broken lines in the drawing) may be used. The setting lever 37 is disposed about an axis 35 on the underside of the base plate 2. One arm 37a of the setting lever is connected to the slide pin 32 of the connecting rod 33 or directly to the connecting rod by means of a coupling rod 38. The other arm 37b of the setting lever is provided with a pin 37c which engages a cam 36a in the setting disk 36. By this arrangement, when the setting disk 36 is rotated in a clockwise direction the setting lever 37 moves in a counterclockwise direction about the axis 35. There is thereby accomplished a successive reduction of the radial distance between the pin 32 (which is the point of articulation to the connecting rod 33) and the axis of rotation 31 of the rocker arm 30. The operation of the driving disk 4 remains constant while the operative connection between the pin 32 and the driving ring 17 through the connecting rod 33 causes the driving ring 17 to travel in a shorter, angular path. Thus the shutter blades 16 swing out to a corresponding smaller opening or diaphragm value.

Provided on the circumference of the setting disk 36 is a mark 39 which is associated with the fixed diaphragm scale 34. The scale series is constructed in such a manner so that the scale value of 2.8 leading to the largest diaphragm aperture is on the left at the start of the series and the scale value of 22 resulting in the smallest diaphragm aperture is on the right at the end of the series. Thus, when the fixed mark 39 of the setting disk 36 is set at the diaphragm value 2.8 as shown in FIGS. 1 and 2, the largest radial distance exists between the point of articulation of the rocker arm 30 or the pin 32 of the connecting rod 33 and the axis 31 of the rocker arm 30. This radial distance diminishes when the relative position of the setting disk 36 to the diaphragm scale 34 is changed to the same extent that the disk 36 is rotated in a clockwise direction. The shortest radial distance is accomplished when the mark 39 coincides with the diaphragm value 22 on the diaphragm scale 34.

In accordance with the present invention, a stop 41 is rotatably disposed about an axis 40 on the base plate 2 to limit the opening motion of the shutter blades 16. The position of the stop is variable in response to the setting motion of the diaphragm setting disk 36. The stop 41 may be in the from of a bell crank lever. According to the exemplary embodiment of the invention shown in FIGS. 1 to 4, one arm 41a of the stop engages a pin 43 located on the driving ring 17, while the other arm 41b of the stop is provided with a pin 41c engaging a cam 36b in the setting disk 36. The cams 36a and 36b of the setting disk 36 function to set the slide pin 32 as well as the stop 41. The two cams are so adjusted that upon a rotary motion of the setting disk 36, simultaneously with the movement of the slide pin 32 caused by the setting lever 37, changes the position of the stop 41 in such fashion that the arm 41a may become operative at the moment that the drive ring reverses during the operation of the shutter, viz., when the driving ring moves somewhat further than normal, a condition which could be caused by play between the parts.

In the modification of the present invention shown in FIGS. 5 and 6, in place of utilizing a single stop, it is possible to use a plurality of stops 45, each of which is pivotally disposed about the axis 44. As shown in FIGS. 5 and 6, each of the modified stops 45 is operatively and directly associated with a respective shutter blade 16. In this form of the invention, each stop 45 is rendered operative by an appropriate cam 46 located on the setting disk 36. In the illustrated arrangement, each of the stops 45 is formed as a lever which is fulcrumed at a point intermediate its ends by a pin 44. One arm 45a which is disposed to cooperate with the shutter blade 16 is provided with a lug 45b at the end thereof. Thus, lug 45b is arranged to engage with the respective shutter blade and form the stop therefor for preventing its respective blade from going beyond its normal range of movement as, for example, due to play between the co-operating parts. The end of stop arm 45c is provided with a pin 45d which is positioned to engage cam 46 formed in the setting disk 36. Thus, it will be apparent that the movement of the setting disk provides the appropriate adjustment for each of the stops 45. The operation of the arrangement described is as follows:

As shown in FIGS. 1 and 2, the intra-lens shutter is set at the largest diaphragm value which is identified as 2.8. Due to the co-action between cam 36a and the adjusting lever 37, pin 32 engaging slot 30a of the rocker arm is moved relative to pivot 31 of the rocker arm at a radial distance a (FIGS. 1 and 2) during the operation of the shutter. Accordingly, movement of the rocker arm 30 is transmitted without a noticeable change in magnitude to the driving ring 17 of the shutter blades 16 by the cranking motion effected by the driving detent 22 linking the driving disk 4 with the connecting rod 33, the latter being connected to the shutter blade driving ring 17. Thus, as seen in FIG. 2, the release of the shutter blades will expose the full opening of the aperture. The stop means 41 which have been appropriately positioned by the setting mechanism 36 limits the movement of the driving ring 17 in the full, open position of the shutter blades 16.

If a smaller diaphragm aperture is desired, all that is required is to merely rotate the setting mechanism 36 in a clockwise direction until the marker or pointer 39 thereof coincides to the desired diaphragm value as, for example, 5.6 on scale 34. This rotary motion of the setting mechanism 36 causes the adjusting lever 37 to be pivoted in a counter-clockwise direction about its axis 35 by means of cam 36a. The adjusting lever 37 thereby effects movement of the pin 32 which is in operative connection with the adjusting lever 34 closer to the axis 31 of the rocker arm 30 and thereby reduces the radial distance therebetween to a distance b as indicated in FIGS. 3 and 4. Thus, if the driving disk 4 now runs down in this changed position of the linkage connections 22, 30, 33, the rocker arm 30 still continues to carry out the same motion while the pin 32 acting on it describes a path which is correspondingly shorter in proportion to the reduction of the radial distance b between pin 32 and pivot 31 of the rocker arm 30. This reduced path is imparted without change by way of the connecting rod 33 to the driving ring 17. Consequently, release of the shutter blades no longer expose the full opening of the aperture but, instead, only the opening of the shutter blades preselected by the position of the diaphragm setting mechanism 36 as is shown in FIG. 4. The stops 41, which have been appropriately positioned upon the initial setting of the diaphragm setting mechanism 36 effects a limiting movement of the diaphragm ring in a manner hereinbefore described.

Variations and modifications may be made without departing from the spirit of the invention or the scope of the appended claims.

I claim:

1. A photographic intra-lens shutter construction comprising a plurality of shutter blades, a shutter blade ring operatively connected to each of said shutter blades for effecting adjustment thereof to provide a variable diaphragm aperture, a shutter ring drive means, a setting mechanism operatively associated with said shuttter ring drive means, and a transmission means interconnecting said shutter ring drive means with said shutter blade ring for obtaining a variable angular travel of said shutter blade driving ring in response to the movement of said setting mechanism, said transmission means including a pivotally positioned rocker arm, a driving pawl connecting said rocker arm to said shutter ring drive means, a connecting rod interconnecting said rocker arm to said shutter ring, said connecting rod having one end connected about a fixed pivot to said shutter ring, and a pin and slot connection connecting its other end to said rocker arm whereby the distance between the pivot of said rocker arm and the pivot of said connecting rod connected thereto is rendered variable in response to the movement of said setting mechanism, said slot of said pin-and-slot connection extending substantially radially to the axis of said rocker arm.

2. The invention as defined in claim 1, wherein a lever means displacedly guides said pin of said pin-and-slot connection in said slot, said lever being fulcrumed about a fixed pivot, said lever having an arm portion thereof operatively connected to said connecting rod and the other arm portion thereof operatively connected with the setting mechanism.

3. A photographic intra-lens shutter construction comprising a plurality of shutter blades, a shutter blade ring operatively connected to each of said shutter blades for effecting adjustment thereof to provide a variable diaphragm aperture, a shutter ring drive means, a setting mechanism operatively associated with said shutter ring drive means, a transmission means interconnecting said shutter ring drive means with shutter blade ring for obtaining a variable angular travel of said shutter blade driving ring in response to the movement of said setting mechanism, and stop means rendered operative in response to the movement of said setting mechanism to limit the swinging motion of the shutter blades with respect to the adjusted aperture setting.

4. The invention as defined in claim 3, wherein said stop includes a stop pin fixed to said shutter ring, and an adjustable limiting stop lever cooperable with said stop pin to limit the movement of said shutter ring, and cooperating means for rendering said stop lever adjustable in response to the movement of said setting mechanism.

5. The invention as defined in claim 3, wherein said stop means includes a plurality of levers, each of said lever being fulcrumed intermediate the ends thereof, and each having an end portion thereof disposed opposite one of the shutter blades and its other end portion operatively connected to said setting mechanism whereby said plurality of stop levers are rendered jointly adjustable.

6. A photographic intra-lens shutter construction comprising:
(a) a shutter blade ring,
(b) a shutter driving means including a rotary member and a driving pawl articularly connected to said rotary member for driving said ring during an exposure run down,
(c) a plurality of shutter blades operatively connected to said ring whereby said blades have imparted thereto a reciprocating movement during said run down,
(d) a transmission means interconnecting said ring to said drive means,
(e) said transmission means including a pivotally positioned rocker, said driving pawl connecting said rocker in driving relationship with said rotary member,
(f) a connecting rod having one end articularly connected to said rocker and having its other end articularly connected to said drive ring,
(g) and means including a setting mechanism operatively associated with a diaphragm scale for rendering the distance between the articulated end of the rod to said rocker and the axis about which said rocker rotates variable for obtaining angular paths of varying lengths of the shutter ring in response to the running down of said drive means.

References Cited by the Examiner
UNITED STATES PATENTS

| | | | |
|---|---|---|---|
| 382,858 | 5/88 | Bausch | 95—63 |
| 436,404 | 9/90 | Dallmeyer | 95—63 |
| 761,756 | 6/04 | Brueck | 95—63 |

NORTON ANSHER, *Primary Examiner.*

JOHN M. HORAN, *Examiner.*